US012076283B2

(12) United States Patent
Raja

(10) Patent No.: US 12,076,283 B2
(45) Date of Patent: Sep. 3, 2024

(54) SMALL ELECTRIC VEHICLE

(71) Applicant: SUZUKI MOTOR CORPORATION, Hamamatsu (JP)

(72) Inventor: Gopinath Raja, Hamamatsu (JP)

(73) Assignee: SUZUKI MOTOR CORPORATION, Shizuoka (JP)

(*) Notice: Subject to any disclaimer, the term of this patent is extended or adjusted under 35 U.S.C. 154(b) by 202 days.

(21) Appl. No.: 17/582,214

(22) Filed: Jan. 24, 2022

(65) Prior Publication Data
US 2022/0233371 A1    Jul. 28, 2022

(30) Foreign Application Priority Data
Jan. 28, 2021 (JP) .................. 2021-012218

(51) Int. Cl.
A61G 5/04 (2013.01)
(52) U.S. Cl.
CPC .............. A61G 5/045 (2013.01); A61G 5/04 (2013.01); A61G 2203/42 (2013.01); B60L 2240/642 (2013.01)
(58) Field of Classification Search
CPC . A61G 5/04; A61G 2203/42; B60L 2240/642; B60L 2200/24; B60L 2200/34
See application file for complete search history.

(56) References Cited

U.S. PATENT DOCUMENTS

| | | | |
|---|---|---|---|
| 6,240,356 B1* | 5/2001 | Lapke | B60T 13/662 701/96 |
| 10,919,463 B1* | 2/2021 | Brown | B60R 21/13 |
| 2002/0011361 A1* | 1/2002 | Richey, II | B60L 15/2036 701/72 |
| 2009/0000839 A1 | 1/2009 | Ishii et al. | |

(Continued)

FOREIGN PATENT DOCUMENTS

| | | |
|---|---|---|
| JP | 4423961 B2 | 12/2008 |
| JP | 5150881 B2 | 12/2012 |

(Continued)

OTHER PUBLICATIONS

Extended European Search Report issued in International Application No. 21213585.9 on May 30, 2022.

(Continued)

Primary Examiner — Ryan Rink
(74) Attorney, Agent, or Firm — TROUTMAN PEPPER HAMILTON SANDERS LLP

(57) ABSTRACT

A small electric vehicle includes: left and right motors connected so as to respectively transmit power to left and right driving wheels; left and right rotation speed sensors; an inclination sensor; a joystick-type operation element; and a control unit, wherein it is configured to calculate target rotation speeds of the left and right motors, based on a target vehicle speed provided by an inclination angle in consideration of the pitch angle and the roll angle detected through the inclination sensor and by an operation position of the (Continued)

operation element, and on a target vehicle angular velocity provided by the inclination angle, by the operation position of the operation element and by the actual speed of the vehicle, and control the left and right motors such that actual rotation speeds of the left and right motors follow the respective target rotation speeds.

9 Claims, 10 Drawing Sheets

(56) References Cited

U.S. PATENT DOCUMENTS

| | | |
|---|---|---|
| 2012/0095636 A1 | 4/2012 | Ishii et al. |
| 2012/0159916 A1 | 6/2012 | Ishii et al. |
| 2012/0238403 A1* | 9/2012 | Koike .................. B60L 15/20 477/1 |
| 2014/0059989 A1 | 3/2014 | Ishii et al. |
| 2016/0029555 A1 | 2/2016 | Ishii et al. |
| 2019/0046373 A1* | 2/2019 | Coulter .................. A61G 5/041 |
| 2020/0121527 A1* | 4/2020 | Lin ........................ A61G 5/1008 |
| 2020/0171962 A1* | 6/2020 | Han ........................ B60W 10/08 |
| 2021/0401639 A1* | 12/2021 | Ozaki ..................... A61G 5/1089 |
| 2023/0079946 A1* | 3/2023 | Fung .................... B66F 9/07509 182/19 |
| 2023/0158894 A1* | 5/2023 | Kim ....................... B60L 15/20 701/22 |

FOREIGN PATENT DOCUMENTS

| | | |
|---|---|---|
| JP | 2014064620 A | 4/2014 |
| JP | 2015024745 A | 2/2015 |
| JP | 2015119817 A | 7/2015 |

OTHER PUBLICATIONS

Office Action issued in counterpart JP Application No. 2021-012218 dated Jun. 28, 2024 (with English translation).

* cited by examiner

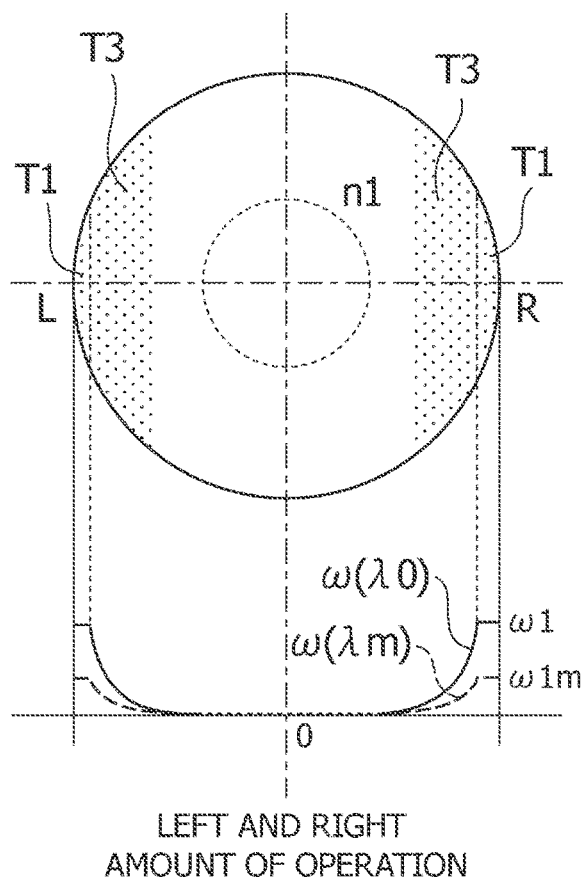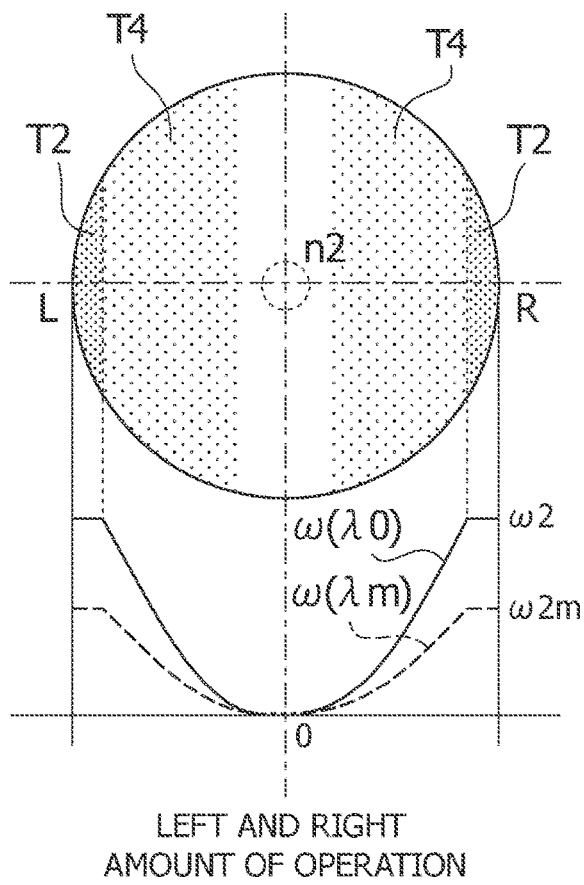

SMALL ELECTRIC VEHICLE

CROSS REFERENCE TO RELATED APPLICATION

The present application claims priority of Japanese Patent Application No. 2021-012218 filed Jan. 28, 2021. The entire contents of which are hereby incorporated by reference.

TECHNICAL FIELD

The present invention relates to a small electric vehicle.

BACKGROUND

Small electric vehicles, including cart-type electric rollators and electric wheelchairs for users having difficulty in walking, such as the elderly, have been publicly known. For example, JP 2014-064620 discloses a small electric vehicle (electric wheelchair) that includes left and right motors that individually drive respective left and right driving wheels, and is configured such that the numbers of revolutions of left and right motors are determined from an operation position of joystick-type operation means, the vehicle goes forward when an operation element is tilted forward, it turns when the piece is tilted obliquely forward, it turns about a fixed position when the piece is tilted obliquely backward, and it stops when the piece is tilted straight backward.

SUMMARY

As for the small electric vehicle as described above, the speed (speed difference between left and right) is determined by the operation position of the joystick-type operation element. Accordingly, in a case of turning at a slow speed, the operation element is required to be held at an intermediate operation position, which leads to a problem for a user to drive at an intended speed on a route. Furthermore, a road inclination is not taken into consideration. In a case in which motors are selected on the basis of flat ground travel, there is a possibility that the torque is insufficient for climbing, and the operability is degraded in comparison with operation on flat ground. Conversely, in a case in which the motors are increased in size for going up inclined slopes, there is a problem of increase in vehicle weight.

The present invention has been made in view of the points of the prior art described above, and has an object to provide a small electric vehicle that can achieve travel control suitable for road inclinations, such as on flat roads and going up upwardly inclined roads, and turning characteristics depending on the driving state, through an intuitive operation on the joystick-type operation element.

To solve the problems, a small electric vehicle according to the present invention includes:

a vehicle body that has a forward and backward direction, and a width direction;

left and right driving wheels provided apart in the width direction of the vehicle body;

free wheels provided apart from the left and right driving wheels in the forward and backward direction of the vehicle body;

left and right motors connected so as to respectively transmit power to the left and right driving wheels;

left and right rotation speed sensors for detecting rotation speeds of the left and right motors;

an inclination sensor for detecting an inclination of the vehicle body as a pitch angle corresponding to a component in the forward and backward direction, and a roll angle corresponding to a component in the width direction;

an operation unit that includes a joystick-type operation element; and a control unit that controls the left and right motors according to an amount of operation on the operation element, wherein the control unit is configured to calculate target rotation speeds of the left and right motors, based on a target vehicle speed provided by an inclination angle in consideration of the pitch angle and the roll angle detected through the inclination sensor and by an operation position of the operation element, and on a target vehicle angular velocity provided by the inclination angle, by the operation position and by the actual speed of the vehicle, and control the left and right motors such that actual rotation speeds of the left and right motors follow the respective target rotation speeds.

The small electric vehicle according to the present invention is configured as described above. Accordingly, the inclination in the forward and backward direction (pitch angle) and the inclination in the width direction (roll angle) that affect the travel of the small electric vehicle can be reflected, as an integrated inclination angle ($\lambda$), in travel control. The speed can be controlled and the acceleration/deceleration characteristics can be changed depending on the inclination angle, and the turning characteristics can be changed depending on the inclination angle and the actual speed. The acceleration/deceleration characteristics and the turning characteristics that support the road inclination and the travel state can be obtained only by an intuitive operation on a joystick-type operation element. The characteristics are effective in improving simplification of the operation and the usability. Furthermore, the loads on the vehicle body system and motors are reduced, which is advantageous in reducing the weight of vehicle body and the manufacturing cost.

BRIEF DESCRIPTION OF THE DRAWINGS

FIG. 7(*a*) shows a target angular velocity map for low speed, depending on the inclination angle ($\lambda$) through joystick operations.

FIG. 7(*b*) shows a target angular velocity map for high speed depending on the inclination angle ($\lambda$) through joystick operations.

DETAILED DESCRIPTION

Hereinafter, embodiments of the present invention are described in detail with reference to the drawings.

Figure 1:
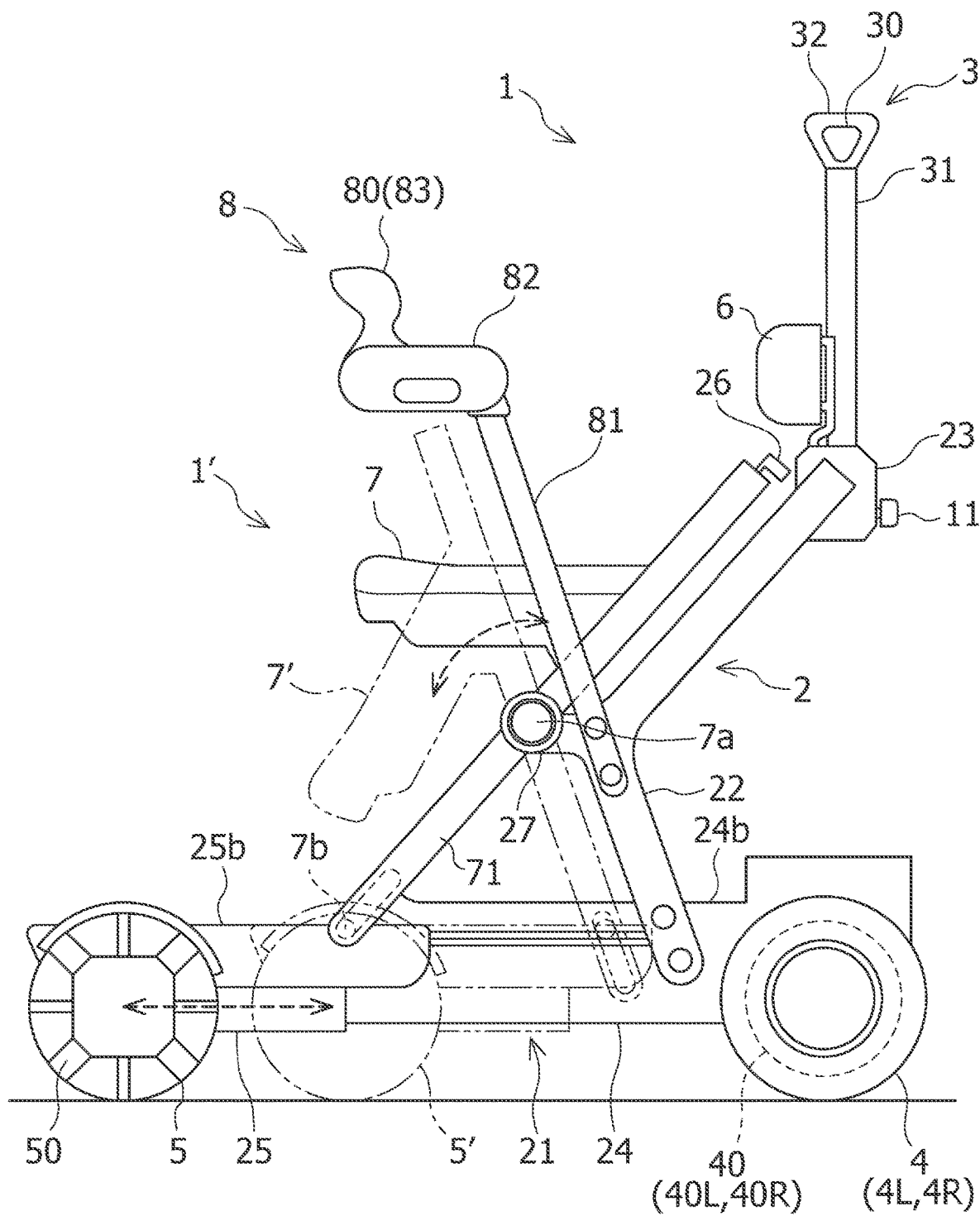
FIG. 1 is a side view showing a small electric vehicle.

In FIG. 1, an electric vehicle 1 according to an embodiment of the present invention includes a vehicle body 2 made up of a mobile base 21 (lower traveling body), and an upper frame 22 provided to stand from a rear part (rear-side base 24) of the mobile base 21, and is usable in a small electric vehicle mode (riding mode 1) indicated by solid lines in the diagram, and in a rollator mode (1') indicated by chain double-dashed lines in the diagram.

The mobile base 21 includes: the rear-side base 24 (main body part) provided with left and right driving wheels 4 (rear wheels), and the upper frame 22; and a front-side base 25 provided with left and right driven wheels 5 (front wheels). The front-side base 25 is joined to the front side of the rear-side base 24 slidably in the front and rear direction. The mobile base 21 is configured such that the wheelbase is expandable and contractible.

The left and right driving wheels 4 are independently driven respectively by left and right motor units 40 (40L and 40R) mounted on the rear-side base 24. The left and right driven wheels 5 is made up of free wheels (omni wheels, or omnidirectional wheels) including many rotatable rollers 50 at grounding parts around axes in circumferential directions. As described later, the electric vehicle 1 can be steered, braked, and driven only by controlling the left and right motor units 40L and 40R.

The upper frame 22 have an inverted U form or a gate shape formed by joining upper ends of a pair of left and right side frames provided to stand upward from both the left and right sides of the rear-side base 24, with an upper end frame extending in the vehicle width direction. A lower end part of a stem 31 of a rear handle 3 is rigidly coupled to a coupling part 23 at the center of the upper end frame in the vehicle width direction, and a seat backrest 6 is supported at the coupling part 23.

The rear handle 3 is formed in a T-bar shape that has a pair of grip parts extending left and right from a connection portion 32 with the upper end of the stem 31. At the left and right grip parts of the rear handle 3, grip sensors 30 that detect a state of gripping (hands on) by a user (or a helper) are provided. Touch sensors, such as capacitance sensors or pressure-sensitive sensors, can be used as the grip sensors 30. The left and right grip parts of the rear handle 3 serve as an operation unit in a case of use by the user himself or herself in the rollator mode (1'), and in a case in which the helper or the like operates the electric vehicle in a case in which the user is seated on the seat 7. Note that although omitted in FIG. 1, an electromagnetic brake release switch 34, and a speaker 35 are provided on the connection portion 32 at the center of the rear handle 3.

Base parts of support frames 81 for armrests 82 are fixed at bent parts at the middle of the upper frame 22 (side frames) in the height direction. A joystick 83, which constitutes a riding mode operation unit 8, is provided at a front end part of the armrest 82 on the right side, which is a deeper side in the FIG. 1. A display unit 80 and a travel permission switch 84 are provided on an upper surface of the grip part having the same shape at a front end part of the armrest 82 on the left side, which is a near side in FIG. 1.

A two-axis joystick that can be tilted to the front, rear, left, and right, and allows an output to be obtained depending on a tilted angle, or a multi-axis joystick involving this function may be used as the joystick 83. A non-contact joystick that uses a Hall sensor is preferable. The joystick 83 is configured such that an urging force (a restoring force or an operational reaction force) toward a neutral position depending on the tilted angle is applied, by an urging member (spring, etc.), not shown. In a state in which no operational force is applied, that is, a state in which the hand of the user is off the joystick 83, the joystick returns by itself to the neutral position. Control of the left and right motor units 40 (40L and 40R) through an operation on the joystick 83 is described later.

At a pivot support part 27 that protrudes forward from the bent parts of the upper frame 22 (side frames), support frames 71 for the seat 7 (seat cushion) are pivotably supported by a shaft 7a in the vehicle width direction. In addition, the lower ends of the support frames 71 are rotatably and slidably joined to the front-side base 25 (pins) via the joining parts 7b (slots).

According to the configuration described above, when the seat 7 at a seating position is turned downward ahead from the riding mode (1), indicated by the solid lines in the diagram, to a folded position (7') as indicated by chain double-dashed lines in the diagram, the front-side base 25 is slid backward in an interlocking manner, the mobile base 21 is shortened, and the mode becomes a rollator mode (1'), which allows user operation while standing and walking with the rear handle 3 being gripped.

Conversely, when the seat (7') at the folded position is moved from the rollator mode (1') to the seating position 7 by turning upward behind, the front-side base 25 slides forward, the mobile base 21 is elongated, and the mode becomes the riding mode (1). In this state, an upper surface 25b of the front-side base 25 moved ahead of a tray 24b can be used as a footrest for a passenger.

Note that locking mechanisms (locking pins or the like urged by urging members, such as springs) that lock the front-side base 25 at each of an elongated position and a shortened position are provided in the mobile base 21, where a vehicle state detection sensor 28 (mechanical switch etc.) that detects the locked state in each position is attached. Furthermore, urging members (springs, etc.) for urging toward the intermediate position (in a release direction) at each of the elongated position and the shortened position are provided. Release tags 26 joined to the locking mechanisms through Bowden cables are provided at upper end portions of the support frames 71.

Accordingly, the configuration is made such that when the release tags 26 are pulled at either of the elongated position and the shortened position, the locking mechanisms are released, the vehicle body 2 is at the intermediate position by being urged by the urging members, and when from this state the seat 7 (support frames 71) is turned forward or backward from the intermediate position against urging by the urging members, and the locking mechanisms are locked at either of the elongated position and the shortened position of the front-side base 25.

Figure 2:
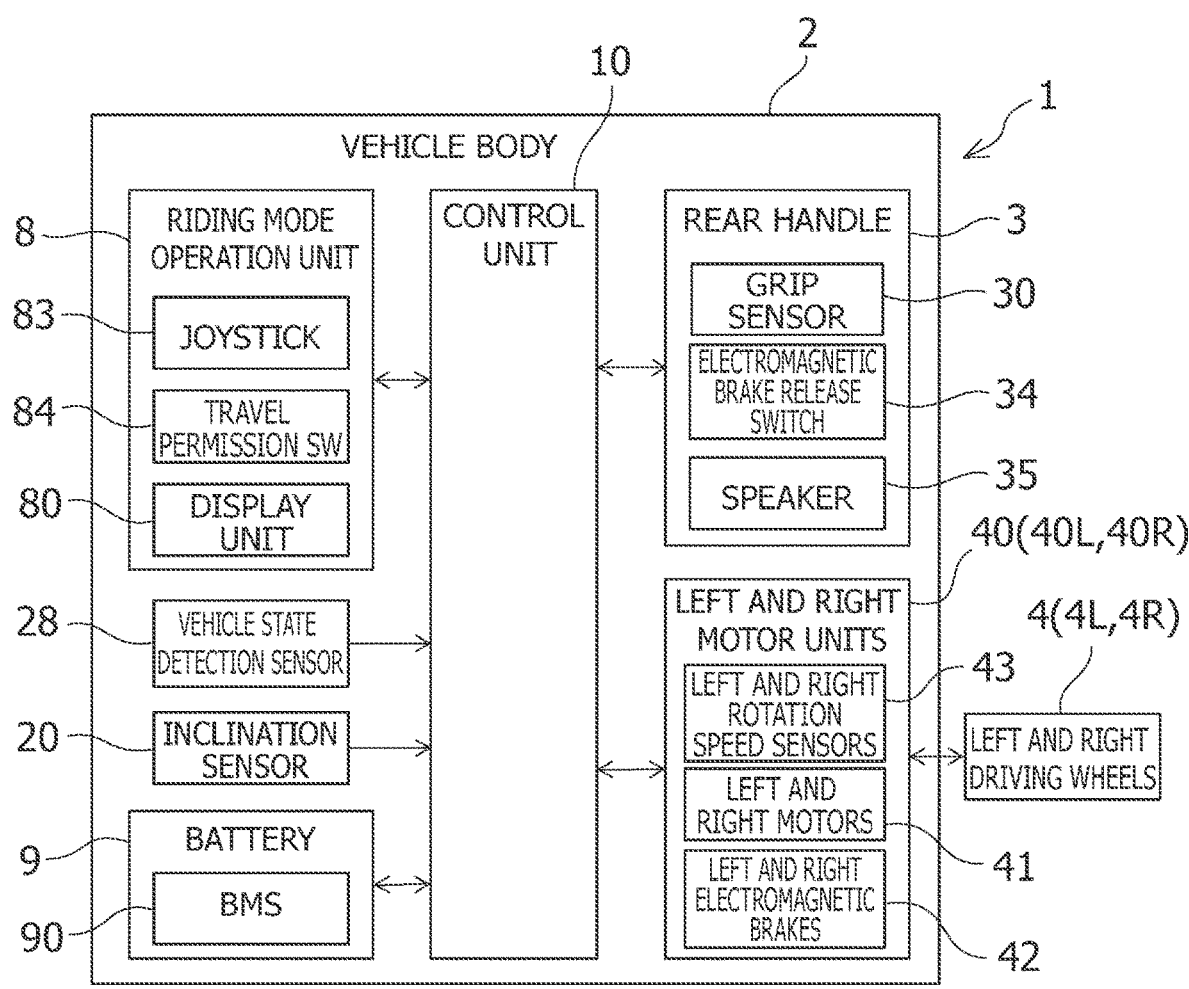
FIG. 2 is a block diagram showing a control system of the small electric vehicle.

FIG. 2 is a block diagram showing a control system of the electric vehicle 1. The electric vehicle 1 includes a battery 9 that supplies power to the left and right motor units 40 (40L and 40R), and a control unit 10 that controls the left and right motor units 40 (40L and 40R). The control unit 10 has an interlock function of executing control for each of the riding mode (1) and the rollator mode (1') in the locked state at the corresponding position detected by the vehicle state detection sensor 28.

In the riding mode (1), the grip sensors 30 are disabled, the control unit 10 is configured to control the speeds of the left and right motor units 40 (40L and 40R) on the basis of a control map, described later, in response to an operation (the amount of operation, and operation direction) on the joystick 83, which constitutes the riding mode operation unit 8, when the travel permission switch 84 is turned on, and allow drive operations that include going forward, backward, turning, and braking and stopping of the electric vehicle 1. Note that when an inclination equal to or greater than a predetermined threshold is detected by an inclination sensor 20, the target speed is corrected in consideration of the gravity (load) applied depending on the inclination.

On the other hand, in the rollator mode (1'), the riding mode operation unit 8 is disabled, the control unit 10 controls the torques of the left and right motor units 40 (40L and 40R) on the basis of detection information from the inclination sensor 20, the left and right rotation speed sensors 43 and the like and of a predetermined control map. Note that when an inclination equal to or greater than a predetermined threshold is detected by the inclination sensor 20, a compensation torque for compensating for the gravity (load), which is applied depending on the inclination, is superimposed on the torque command value. The grip sensor 30 only detects a grip (hands on/off) on the rear handle 3 by the user, and is not involved in the torque control of the motor units 40.

The control unit 10 includes: a computer (microcomputer) made up of a ROM that stores a program and data for executing control in each of the modes, a RAM that temporarily stores a computation processing result, a CPU that performs computation processes and the like; and a power source circuit that includes drive circuits (motor drivers) for the left and right motors 41, and a relay that turns the power of the battery 9 on and off.

The left and right motor units 40 (40L and 40R) each include a motor 41, an electromagnetic brake 42 that locks the rotor of the corresponding motor 41, and a rotational position sensor (43) that detects the rotational position of the corresponding motor 41. Drive shafts of the motors 41 are connected to the respective driving wheels 4 (4L and 4R) via reduction gears, not shown, in a power-transmissible manner.

The left and right motors 41 are made up of brushless DC motors that switch the currents in coils in corresponding phases in the drive circuits to support the phases of rotors detected by the rotational position sensors (43). In the riding mode (1), the rotational position sensors (Hall sensors) are used as vehicle speed sensors (43) that detect the actual speed of the electric vehicle 1. In the rollator mode (1'), the rotational position sensors are used as the rotation speed sensors 43.

The drive circuits for the left and right motors 41 include current sensors that detect coil currents. The coil currents correspond to the torques of the left and right motors 41. The control unit 10 executes the torque control of the left and right motors 41 by controlling the coil currents through PWM control (pulse width modulation control) or the like.

Preferably, the electromagnetic brakes 42 are negative actuated type electromagnetic brakes that lock the drive shafts of the motors 41 in an unexcited state, and release the locking in an excited state. By adopting the negative actuated type electromagnetic brakes, the electric vehicle 1 can be securely stopped when the key is turned off or at a stop without consuming power.

On the other hand, to cause the locks of the electromagnetic brakes 42 to be released and allow the electric vehicle 1 to be movable in case of urgency or emergency, for example, in a case in which it is intended to move the electric vehicle 1 without using the power of the motors 41, or in an undrivable case due to reduction in remaining battery charge, the electromagnetic brake release switch 34 is provided as forcible release means for the electromagnetic brakes 42. The electromagnetic brake release switch 34 is provided adjacent to the grip part of the rear handle 3, but is operable irrespective of detection of gripping of the grip sensor 30.

The inclination sensor 20 is implemented on a circuit board of the control unit 10 mounted in the mobile base 21 (rear-side base 24) of the vehicle body 2. A two-axis inclination sensor or an acceleration sensor that detects the inclination in the front and rear direction of the vehicle body 2 (pitch angle P) and the inclination in the lateral direction (roll angle R), or a multi-axis inertial sensor where an angular acceleration sensor (gyroscope sensor) is additionally integrated with the aforementioned sensor is usable.

(Travel Control in Riding Mode)

According to the electric vehicle 1 configured as described above, in the riding mode (1), the rotation speeds of the left and right motors 41 (40L and 40R) are controlled based on an operation (an amount of operation and an operation direction) of the joystick 83 by the user. However, the target rotation speeds of the left and right motors 41 (40L and 40R) are not immediately determined from the operation position of the joystick 83. Instead, according to an inclination angle $\lambda$ in consideration of the pitch angle P and the roll angle R detected by the inclination sensor 20, the target vehicle speed (straight travel speed) based on the operation position of the joystick 83, and the target vehicle angular velocity based on the left and right direction components of the operation position of the joystick 83 are separately calculated. Based on them, the target rotation speeds of the left and right motors 41 (40L and 40R) corresponding to the rotation speeds of the left and right driving wheels 4 (4L and 4R) are calculated.

The inclination angle $\lambda$ is calculated by, for example, the following expression 1.

$$\lambda = |P| + |R| \qquad \text{(Expression 1)}$$

The electric vehicle 1, which assumes travel on a sidewalk, changes the direction or turns on an inclined surface in some cases other than cases of traveling on an upwardly sloping road along the direction of a track. In such cases, not only the inclination (pitch angle P) in the forward and backward direction of the vehicle body 2, but also the inclination (roll angle R) in the width direction affects the behavior of the vehicle.

In particular, in a case of climbing on an inclined surface in an oblique direction on the inclined surface, or in a case of turning while climbing on the inclined surface, the pitch angle P is smaller in comparison with a case of direct climbing on the inclined surface. However, the loads on the left and right motors 41 (40L and 40R) and the load on the posture of the user are heavier by the amount of the roll angle. Likewise, even in a case of traveling downhill on an inclined surface in an oblique direction on the inclined surface, or in a case of turning while traveling downhill on the inclined surface, the pitch angle P is smaller in comparison with a case of direct traveling downhill on the inclined surface. However, the loads on the left and right motors 41 (40L and 40R) are heavier. The user feels that the behavior of the vehicle is abrupt.

Accordingly, in a case with a road inclination, in particular, in a case with the inclination (roll angle R) in the width direction in addition to the inclination (pitch angle P) in the forward and backward direction of the vehicle body 2, when control is performed according to the target vehicle speed and the target vehicle angular velocity identical to those on a flat road, the loads on the left and right motors 41 (40L and 40R) as well as the load on the user become heavy.

For evaluating such an inclination in consideration of the traveling direction of the vehicle 1 with respect to the inclined surface, it is confirmed, through a driving test, that by obtaining the inclination angle λ through an addition equation, such as the expression 1, an indicator of the road inclination and the vehicle inclination in conformity with the actual situation is obtained.

Hereinafter, embodiments of control (hereinafter called lambda control) that changes the target vehicle speed and the target vehicle angular velocity depending on the inclination angle λ are described with reference to the drawings.

First Embodiment

Figure 3:
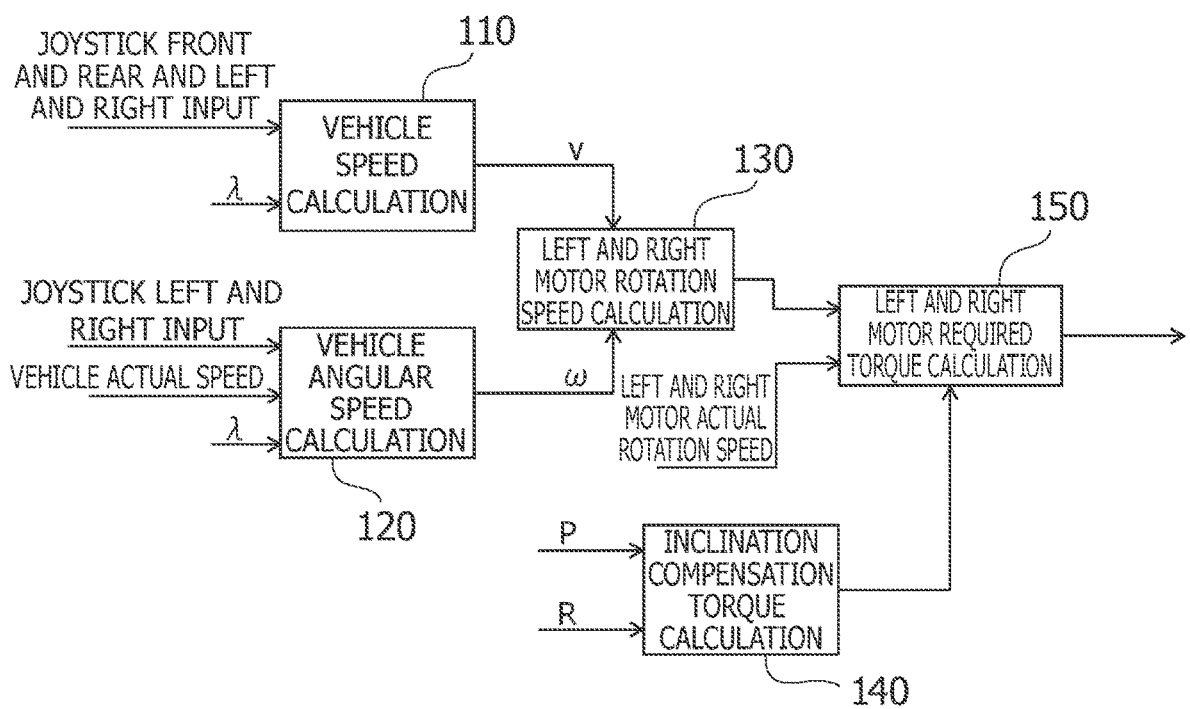
FIG. 3 is a block diagram showing left and right motor control according to a first embodiment.

FIG. 3 is a block diagram showing left and right motor control according to a first embodiment in consideration of the inclination angle λ. As shown in the diagram, a target vehicle speed calculation block 110 uses not only an input of the front and rear direction on the joystick 83 but also an input of the left and right direction. Furthermore, the inclination angle λ is also considered. Accordingly, speed control different from that during straight traveling, for example, traveling at a reduced speed, can be executed during turning depending on the road inclination and the traveling direction of the vehicle, without particular consideration for traveling at a reduced speed.

Not only a left and right direction input on the joystick 83 and the inclination angle λ, but also the vehicle actual speed during operation, is reflected in a target vehicle angular velocity calculation block 120. Accordingly, the turning characteristics can be changed depending on the road inclination and the traveling speed of the electric vehicle 1.

In the block diagram of FIG. 3, based on the target rotation speeds of the left and right motors 41 (40L and 40R) corresponding to the target vehicle speed v calculated by the target vehicle speed calculation block 110, and on the difference between the target rotation speeds of the left and right motors 41 (40L and 40R) corresponding to the target vehicle angular velocity ω calculated by the target vehicle angular velocity calculation block 120, the target rotation speeds of the left and right motors 41 (40L and 40R) are calculated in a left and right motor target rotation speed calculation block 130.

Furthermore, in the left and right motor required torque calculation block 150, based on the actual rotation speeds of the left and right motors 41 (40L and 40R) detected by the left and right rotation speed sensors 43, and on the target rotation speeds of the left and right motors 41 (40L and 40R), the required left and right motor torques are calculated by feedback control (e.g., PID control) that causes the actual rotation speeds of the left and right motors 41 (40L and 40R) to follow the respective target rotation speeds. Based on these, current control for the left and right motors 41 (40L and 40R) is executed.

When the inclination sensor 20 detects a vehicle inclination (the pitch angle P and the roll angle R) equal to or greater than a predetermined threshold, a compensation torque calculation block 140 calculates a compensation torque in a direction of compensating for the climbing/traveling downhill load applied depending on the pitch angle P and/or the lateral direction load applied depending on the roll angle R, and superimposes the torque on the left and right motor required torques calculated by the left and right motor required torque calculation block 150.

(Target Vehicle Speed Map)

Figure 6:
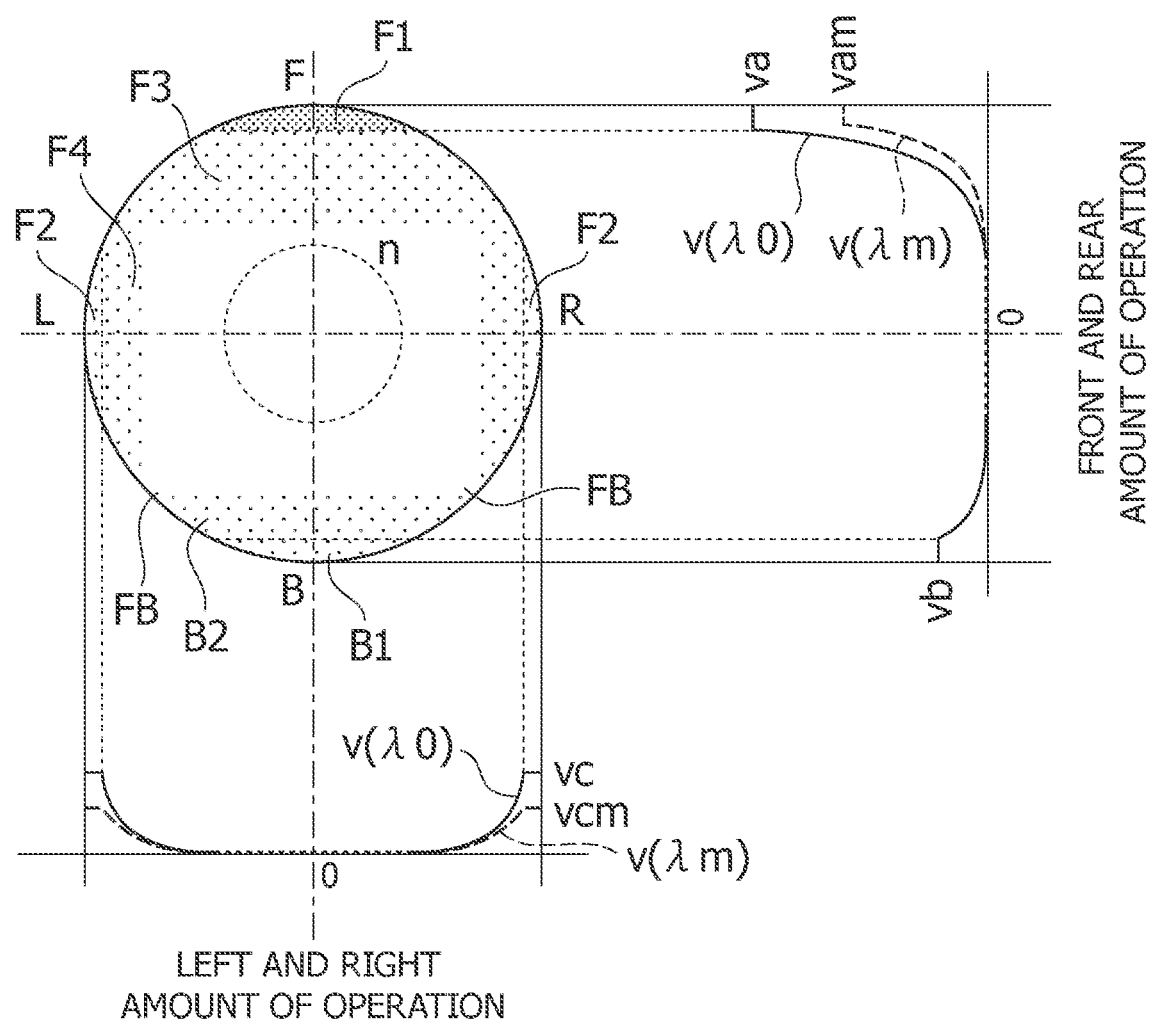
FIG. 6 is a target vehicle speed map depending on the inclination angle ($\lambda$) through the joystick operation.

FIG. 6 shows a target vehicle speed map for target vehicle speed calculation (110) by a joystick operation. In the diagram, solid lines for the front and rear amount of operation and the left and right amount of operation indicate the target vehicle speed map in a case in which the inclination angle λ=λ0 (zero inclination), and broken lines indicate the target vehicle speed map in a case in which the inclination angle λ=λm (set maximum inclination angle).

These target vehicle speed maps are stored as a look-up table in a ROM area of the control unit 10. When the inclination angle λ given by the expression 1 described above is zero degrees or less than a predetermined threshold λ1 (e.g., three degrees) that can be substantially assumed as a flat land, the target vehicle speed map with the inclination angle λ=λ0 is applied. When the inclination angle λ is equal to or greater than the set maximum inclination angle, the target vehicle speed map with the inclination angle λ=λm is applied.

When the inclination angle λ is equal to or greater than the predetermined threshold λ1 and less than the set maximum inclination angle λm, calculation is performed using a conversion equation for proportional distribution as in the following expression 2, from an output value X0 based on the target vehicle speed map in the case with the inclination angle λ=λ0, and an output value λm based on the target vehicle speed map in the case with the inclination angle λ=λm.

$$X = X0 + (\lambda - \lambda 1)^*(Xm - X0)/(\lambda m - \lambda 1) \quad \text{(Expression 2)}$$

In FIG. 6, according to the target vehicle speed map that has the inclination angle λ=λ0 and serves as the basis, when the operation position of the joystick 83 is in a forward region F1 including the front end in the operation range, a target forward speed va is designated. When the position in a backward region B1 including the rear end, a target backward speed vb is designated. When the operation position of the joystick 83 is in any of left and right side regions F2 including the left and right ends, a target forward speed vc is designated. When the position in a center region n including the center (neutral position), stopping (a target speed of zero) is designated.

As indicated in maps on the right side and the lower side in FIG. 6, the target forward speed va in the forward region F1 is higher than the target forward speed vc in the left and right side regions F2. The target forward speed vc in the left and right side regions F2 has a greater (or equal) absolute value than the target backward speed vb in the backward region B1 has. For example, according to the map with the inclination angle λ=λ0, the target forward speed va can be 3 to 5 km/h, the target forward speed vc can be 1 to 2 km/h, and the target backward speed vb can be 1 km/h.

Furthermore, in FIG. 6, transition regions F3 and F4 where the target forward speed increases from the center region n toward the forward region F1 and the left and right side regions F2 are provided between the center region n and the forward region F1, and between the center region n and the left and right side regions F2. A transition region B2 in which the target backward speed increases from the center region n toward the backward region B1 is provided between the center region n and the backward region B1. When the operation position of the joystick 83 is in the transition region F3 or the transition region B2, an intermediate target forward speed or an intermediate target backward speed is designated.

Consequently, not only when the joystick 83 is operated to the forward region F1 (and its transition region F3) but also when the joystick 83 is operated to any of the left and right side regions F2 (and its transition region F4), the target forward speed vc is designated, thereby allowing the forward rotation to be output even when a target vehicle angular velocity ±ω from a target vehicle angular velocity calculation 120 block, described later, is input.

This is because the lateral movement of free wheels 5 made up of omni wheels is achieved by the rotation of the rollers 50, and the start performance and the step traveling performance are lower than those during straight traveling, and accordingly, the load on the system is reduced by preventing pivot turn (spin turn) due to an intuitive turning operation. Note that when the joystick 83 is operated obliquely backward FB, the target speed is zero at the middle between the left and right side regions F2 and the backward region B1. Pivot turn (spin turn) can be achieved at a narrow place, such as in a room or an elevator entrance.

According to the target vehicle speed map in the case with the inclination angle λ=λm indicated by the broken lines in FIG. 6, a target forward speed vam when the operation position of the joystick 83 is in the forward region F1, and a target forward speed vcm when the position is in any of the left and right side regions F2 are designated to have a smaller value in comparison with the case with inclination angle λ=λ0.

For example, according to the target vehicle speed map with the inclination angle λ=λm, the target forward speed vam can be 2 to 3 km/h, and the target forward speed vcm can be 0.5 to 1 km/h. In addition, the target backward speed vb when the operation position of the joystick 83 is in the backward region B1 may have the same value (e.g., 1 km/h) as in the case with the inclination angle λ=λ0.

As described above, it is advantageous, according to the lambda control, that changes the target forward speed va to vam and vc to vcm depending on the inclination angle λ, the target forward speed is set to have a relatively small value during inclined travel, the load on the user due to the behavior of the vehicle 1 is reduced, and the loads on the left and right motors 41 (40L and 40R) (required specifications) are reduced.

(Target Vehicle Angular Velocity Map)

Next, FIG. 7 shows a target vehicle angular velocity map for target vehicle angular velocity calculation (120) through joystick operation. The target vehicle angular velocity map includes: a target vehicle angular velocity map for low speed (a) that defines the target vehicle angular velocity when the actual speed is in a low speed region or a speed of zero; and a target vehicle angular velocity map for high speed (b) that defines the target vehicle angular velocity when the actual speed is at the maximum speed or in a predetermined high speed region in the setting speed region for the vehicle.

These target vehicle angular velocity maps (a) and (b) each define a target vehicle angular velocity map (solid lines) when the inclination angle λ=λ0 (zero inclination), and a target vehicle angular velocity map (broken lines) when the inclination angle λ=λm (set maximum inclination angle). Both are stored as a look-up table in the ROM area of the control unit 10.

When the inclination angle λ given by the expression 1 described above is zero degrees or less than the predetermined threshold λ1 (for example, three degrees), which can be substantially assumed to be flat land, the target vehicle angular velocity map with the inclination angle λ=λ0 is applied. When the inclination angle λ is equal to or greater than the set maximum inclination angle λm (e.g., 10 degrees), the target vehicle angular velocity map with the inclination angle λ=λm is applied. When the inclination angle λ is equal to or greater than the predetermined threshold λ1 and less than the set maximum inclination angle λm, calculation is performed using the conversion equation of the expression 2 described above, from the output value λ0 based on the target vehicle angular velocity map with the inclination angle λ=λ0 and the output value λm based on the target vehicle angular velocity map with the inclination angle λ=λm.

According to the target vehicle angular velocity map for low speed (a) with the inclination angle λ=λ0 indicated by the solid lines in FIG. 7, the target vehicle angular velocity co is designated when the operation position of the joystick 83 is in left and right side regions T1 including the left and right ends in the operation range, and the target vehicle angular velocity of zero is designated when the position is in a center region n1 including the center (neutral position). Transition regions T3 in which the target vehicle angular velocity ω gradually increases from the center region n toward the left and right side regions T1 are provided between the center region n1 and the left and right side regions T1.

Likewise, according to the target vehicle angular velocity map for high speed (b) with the inclination angle λ=λ0, the target vehicle angular velocity ω2 is designated when the operation position of the joystick 83 is in left and right side regions T2 including the left and right ends in the operation range, and the target vehicle angular velocity of zero is designated when the position is in a center region n2 including the center (neutral position). Transition regions T4 in which the target vehicle angular velocity ω gradually increases from the center region n2 toward the left and right side regions T2 are provided between the center region n2 and the left and right side regions T2.

Here, the maximum target vehicle angular velocity ω2 in the left and right side regions T2 in the target vehicle angular velocity map for high speed (b) is higher than the maximum target vehicle angular velocity ω1 in the left and right side regions T1 in the target vehicle angular velocity map for low speed (a), and the center region n2 in the target vehicle angular velocity map for high speed (b) is narrower than the center region n1 in the target vehicle angular velocity map for low speed (a). The transition regions T4 in the target vehicle angular velocity map for high speed (b) are wider than the transition regions T3 in the target vehicle angular velocity map for low speed (a).

According to a preferable embodiment, the target vehicle angular velocity map for low speed (a) corresponds to a case in which the actual speed of the vehicle is equal to or less than 0.5 km/h, which can be substantially assumed as zero. The target vehicle angular velocity map for high speed (b) corresponds to a case in which the actual speed of the vehicle is 4.5 km/h. The maximum target vehicle angular velocity ω1 in the left and right side regions T1 in the target vehicle angular velocity map for low speed (a) with the inclination angle λ=λ0 is 60 degrees per second (1.05 rad/s). The maximum target vehicle angular velocity ω2 in the left and right side regions T2 in the target vehicle angular velocity map for high speed (b) in the case with the inclination angle λ=λ0 is 90 degrees per second (1.57 rad/s) to 120 degrees per second (2.09 rad/s).

In a case with the inclination angle λ=λm indicated by the broken lines in FIG. 7, a smaller value than that in the case with the inclination angle λ=λ0 is designated as a target vehicle angular velocity ω1m in the target vehicle angular velocity map for low speed (a), and a target vehicle angular velocity ω2 in the target vehicle angular velocity map for high speed (b), when the operation position of the joystick 83 is in any of the left and right side regions T1. For example, 30 degrees per second (0.52 rad/s) are designated as the target vehicle angular velocity $\omega 1m$ in the case with the inclination angle $\lambda=\lambda m$, and 60 degrees per second (1.05 rad/s) are designated as the target vehicle angular velocity $\omega 2m$.

Note that instead of setting of the transition regions T4, in which the target vehicle angular velocity continuously changes depending on the operation position of the joystick 83, between the left and right side regions T2 and the center region n2, a region with an intermediate target vehicle angular velocity of for example, 90 degrees per second (1.57 rad/s) may be set.

The control unit 10 calculates the actual speed of the electric vehicle 1 on the basis of the actual rotation speeds of the left and right motor units 40 (40L and 40R) detected by the respective rotation speed sensors 43. Depending on the vehicle actual speed and the inclination angle $\lambda$, the target vehicle angular velocity map for low speed (a) or the target vehicle angular velocity map for high speed (b) is selectively applied. Alternatively, when the actual speed is in an intermediate speed region between the low speed region and the high speed region, the target vehicle angular velocity corresponding to the actual speed and the inclination angle $\lambda$ are calculated from the target vehicle angular velocity map for low speed (a) and the target vehicle angular velocity map for high speed (b).

For example, if first and second, two-step, speed thresholds are configured, and the map is switched to the target vehicle angular velocity map for high speed (b) when the actual speed becomes equal to or greater than the second speed threshold (e.g., 2.5 km/h) from the low speed region during application of the target vehicle angular velocity map for low speed (a), and the map is switched to the target vehicle angular velocity map for low speed (a) when the actual speed becomes less than the first speed threshold (e.g., 1.5 km/h) lower than the second speed threshold during application of the target vehicle angular velocity map for high speed (b), the map switching frequency can be reduced and stable control can be performed.

It may be configured such that when the target vehicle angular velocity corresponding to the actual speed is calculated from the target vehicle angular velocity map for low speed (a) and the target vehicle angular velocity map for high speed (b), a target vehicle angular velocity may be designated to which target vehicle angular velocity designation values in the target vehicle angular velocity map for low speed (a) and the target vehicle angular velocity map for high speed (b) are proportionally distributed depending on the rate of the current actual speed to the actual speed corresponding to the target vehicle angular velocity map for high speed (b).

According to the configuration of applying the target vehicle angular velocity map for low speed (a) and the target vehicle angular velocity map for high speed (b) depending on the actual speed and the inclination angle $\lambda$ as described above, the following turning characteristics can be obtained.

That is, when the electric vehicle 1 is substantially in a stop state (the actual speed is in the low speed region or the speed of zero), the relatively large center region n1 (insensitive zone) is set on both the left and right sides of the neutral position of the joystick 83. Even if the user operates the joystick 83 to the left or right in this range, the electric vehicle 1 does not start to move. Accordingly, as described above, immediate transition from the substantially stop state to the turning motion is prevented, and only when the user clearly intentionally operates the joystick 83 to any of the left and right side regions T1, forward traveling or turning is started.

On the other hand, when the actual speed of the electric vehicle 1 is in a high speed region, for example, when the user operates the joystick 83 forward and the vehicle is in a forward travelling state, the transition regions T4 are set adjacent to the left and right sides of the neutral position. By the user operating the joystick 83 from the forward tilted position to the left or right, traveling in a desired direction can be achieved while finely adjusting the course, and the steerable performance fairly corresponding to the straight travel speed of the electric vehicle 1 can be obtained.

It is advantageous that, according to the lambda control that changes the target vehicle angular velocities $\omega 2$ to $\omega 2m$ and $\omega 1$ to $\omega 1m$ depending on the inclination angle $\lambda$, the target vehicle angular velocity be set to have a relatively small value during inclined travel, the load on the user due to the turning behavior of the vehicle 1 is reduced, and the loads on the left and right motors 41 (40L and 40R) (required specifications) are reduced.

Second Embodiment

According to the first embodiment described above, the case in which the target vehicle speed v and the target vehicle angular velocity $\omega$ are changed depending on the inclination angle $\lambda$ has been described. By additionally changing the target vehicle acceleration a and the target vehicle angular acceleration a depending on the inclination angle $\lambda$, the behavior of the electric vehicle 1 can be further optimized.

Figure 4:
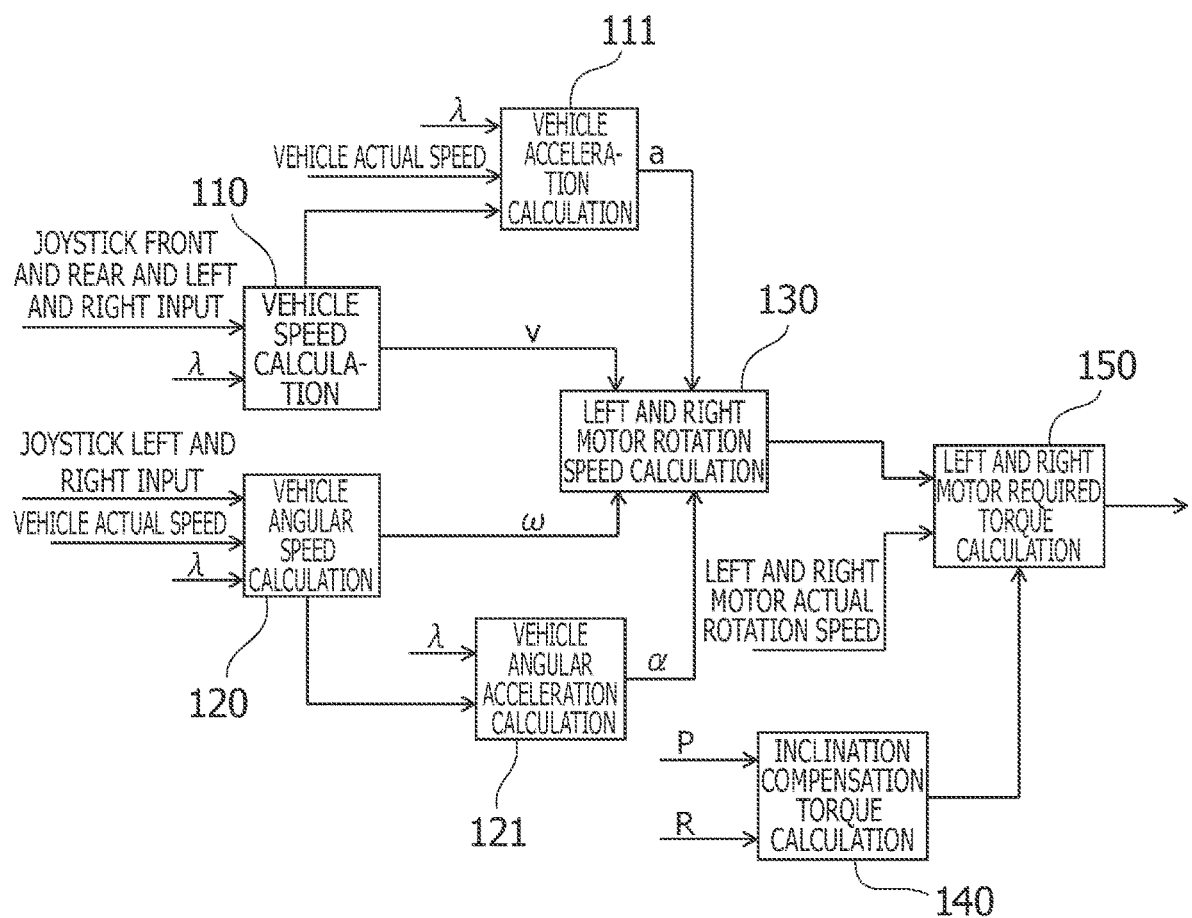
FIG. 4 is a block diagram showing left and right motor control according to a second embodiment.

FIG. 4 is a block diagram showing left and right motor control according to a second embodiment in consideration of the inclination angle $\lambda$. In comparison with the block diagram in the first embodiment shown in FIG. 3, a target vehicle acceleration calculation block 111 and a target vehicle angular acceleration calculation block 121 are added.

The target vehicle acceleration calculation block 111 receives the target vehicle speed v calculated by the target vehicle speed calculation block 110, the vehicle actual speed, and inclination angle $\lambda$. The target vehicle acceleration a is calculated depending on the deviation between the vehicle actual speed and the target vehicle speed v and on the inclination angle $\lambda$. The target vehicle acceleration a is the rate of change of speed in control that causes the vehicle actual speed to follow the target vehicle speed v given by the front, rear, left and right input on the joystick 83 and by the inclination angle $\lambda$, and corresponds to the sensitivity of speed control.

In addition, the target vehicle angular acceleration calculation block 121 receives the target vehicle angular velocity $\omega$ calculated by the target vehicle angular velocity calculation block 120, and the inclination angle $\lambda$. The target vehicle angular acceleration a is calculated depending on the deviation between the difference between the target rotation speeds of the left and right motors 41 (40L and 40R) corresponding to the target vehicle angular velocity $\omega$, and the difference between the actual rotation speeds of the left and right motors 41 (40L and 40R) detected by the rotation speed sensors 43, and on the inclination angle $\lambda$. The target vehicle angular acceleration a is the rate of change of angular velocity in control that causes the difference between the actual rotation speeds to follow the difference between the target rotation speeds of the left and right motors 41 (40L and 40R) corresponding to the target vehicle angular velocity ω given by the left and right input on the joystick 83, the vehicle actual speed and the inclination angle λ, and corresponds to the sensitivity of turning control.

Consequently, in the block diagram in the second embodiment shown in FIG. 4, in the lambda control that changes the target vehicle speed v and the target vehicle angular velocity ω depending on the inclination angle λ, the sensitivities of the speed control and the turning control, i.e., the response speed, can be adjusted.

(Target Vehicle Acceleration Map)

Figure 8:
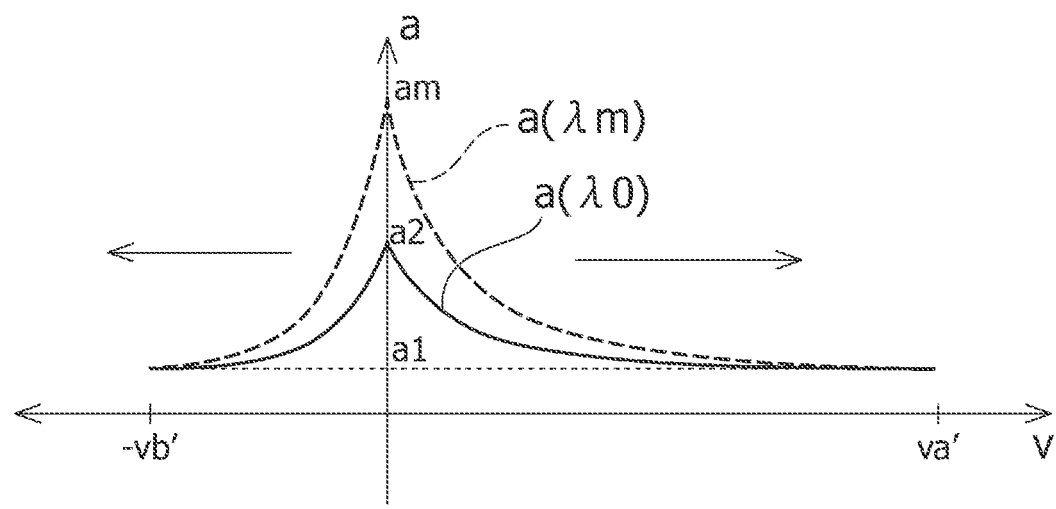
FIG. 8 shows a target vehicle acceleration map depending on the inclination angle ($\lambda$) and actual speed.

FIG. 8 shows a target vehicle acceleration map that defines a relationship between the vehicle actual speed v and the target vehicle acceleration a for target vehicle acceleration calculation (111). Solid lines in the diagram indicate the target vehicle acceleration map in the case with the inclination angle λ=λ0 (zero inclination). Broken lines indicate the target vehicle acceleration map in the case with the inclination angle λ=λm (set maximum inclination angle).

These target vehicle acceleration maps are stored as look-up tables in a ROM area of the control unit 10. When the inclination angle λ given by the expression 1 described above is zero degrees or less than a predetermined threshold λ1 (e.g., three degrees) that can be substantially assumed as a flat land, the target vehicle acceleration map with the inclination angle λ=λ0 is applied. When the inclination angle λ is equal to or greater than the set maximum inclination angle, the target vehicle acceleration map with the inclination angle λ=λm is applied.

When the inclination angle λ is equal to or greater than the predetermined threshold λ1 and less than the set maximum inclination angle λm, calculation is performed using the expression 2 described above, from an output value X0 based on the target vehicle acceleration map in the case with the inclination angle λ=20, and an output value λm based on the target vehicle acceleration map in the case with the inclination angle λ=λm.

According to the target vehicle acceleration map shown in FIG. 8, when the vehicle actual speed v is zero, the maximum target vehicle accelerations a2 and am are designated. In addition, with respect to the target vehicle acceleration a2 (e.g., 2 km/h/s=0.56 m/s$^2$) in the case with the inclination angle λ=20, the target vehicle acceleration am (e.g., 4 km/h/s=1.11 m/s$^2$) in the case with the inclination angle λ=λm has a larger value. In each of the cases, the more the vehicle actual speed v increases, the smaller the target vehicle acceleration becomes. In the high speed region in the forward traveling direction and the backward traveling direction, a lower limit value a1 (e.g., 1 km/h/s=0.28 m/s$^2$) is achieved.

That is, in a case in which the speed is zero or in the low speed region, the speed is caused to rapidly reach the target vehicle speed v. In addition, in a case of being in the state of traveling in the high speed region, abrupt change in speed is suppressed. Thus, the traveling stability is secured.

When the inclination angle λ is large, the target vehicle speed v calculated by the target vehicle speed calculation block 110 is set to be smaller (vam at the maximum) than that in the case of a small inclination angle λ (va at the maximum). Accordingly, only with such control based on the target vehicle speed v, it is felt that starting of the vehicle 1 in response to the operation on the joystick 83 is sluggish when the inclination angle λ is large. Accordingly, when the inclination angle λ is large, the target vehicle acceleration (am at the maximum) is set to be large instead of setting the target vehicle speed (vam at the maximum) to be small in the low speed region to increase the sensitivity of speed control, thereby allowing the operational feeling similar to that on flat land to be obtained.

(Target Vehicle Angular Acceleration Map)

Figure 9:
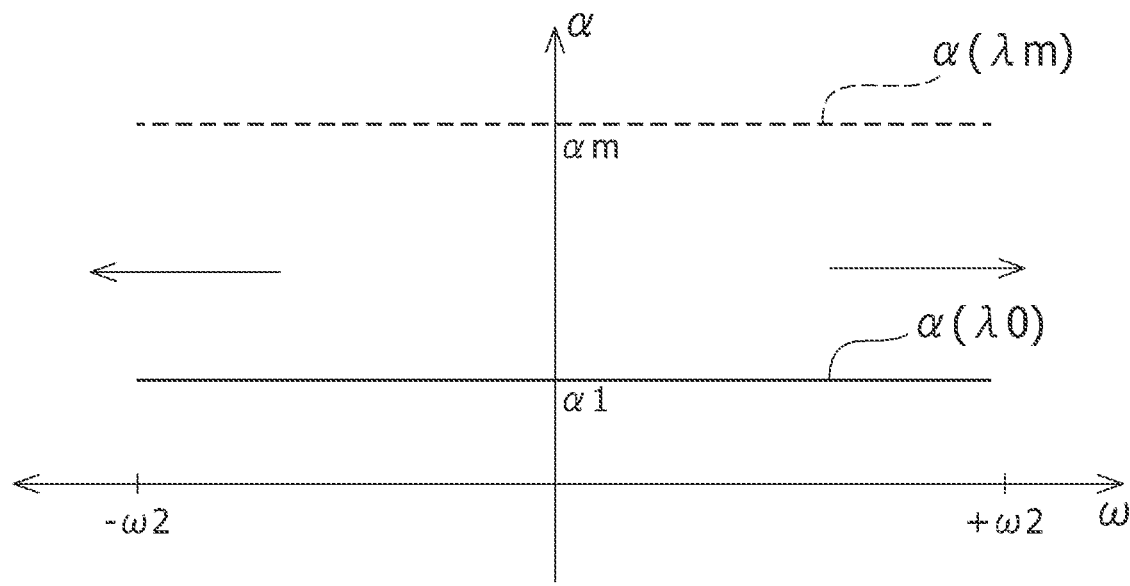
FIG. 9 shows a target vehicle angular acceleration map depending on the inclination angle ($\lambda$) and actual speed.

FIG. 9 shows a target vehicle angular acceleration map that defines a relationship between the angular velocity ω and the target vehicle angular acceleration a for target vehicle angular acceleration calculation (121). Solid lines in the diagram indicate the target vehicle angular acceleration map in the case with the inclination angle λ=λ0 (zero inclination). Broken lines indicate the target vehicle angular acceleration map in the case with the inclination angle λ=λm (set maximum inclination angle).

According to the target vehicle angular acceleration map shown in FIG. 9, in comparison with the target vehicle angular velocity a1 in the case with the inclination angle λ=λ0 (e.g., 120 degrees/s$^2$=2.09 rad/s$^2$), a large target vehicle angular acceleration am (e.g., 720 degrees/s$^2$=12.56 rad/s$^2$) is designated in the case with the inclination angle λ=λm. When the inclination angle λ is large, the sensitivity of turning control is increased, thereby obtaining the operational feeling similar to that on a flat land.

Third Embodiment

According to the second embodiment described above, the case in which the target vehicle speed v, the target vehicle angular velocity ω, the target vehicle acceleration a, and the target vehicle angular acceleration a are changed depending on the inclination angle λ has been described. According to a third embodiment shown in FIG. 5, a case is described in which a target vehicle deceleration calculation block 112 with the target vehicle speed v tending to decrease is added besides the target vehicle acceleration calculation block 111 with the target vehicle speed v tending to increase, a target vehicle angular deceleration calculation block 122 with the target vehicle angular velocity ω tending to decrease is added besides the target vehicle angular acceleration calculation block 121 with the target vehicle angular velocity ω tending to increase, thus allowing the acceleration, deceleration, angular acceleration and the angular deceleration to be individually set depending on the inclination angle λ.

Figure 5:
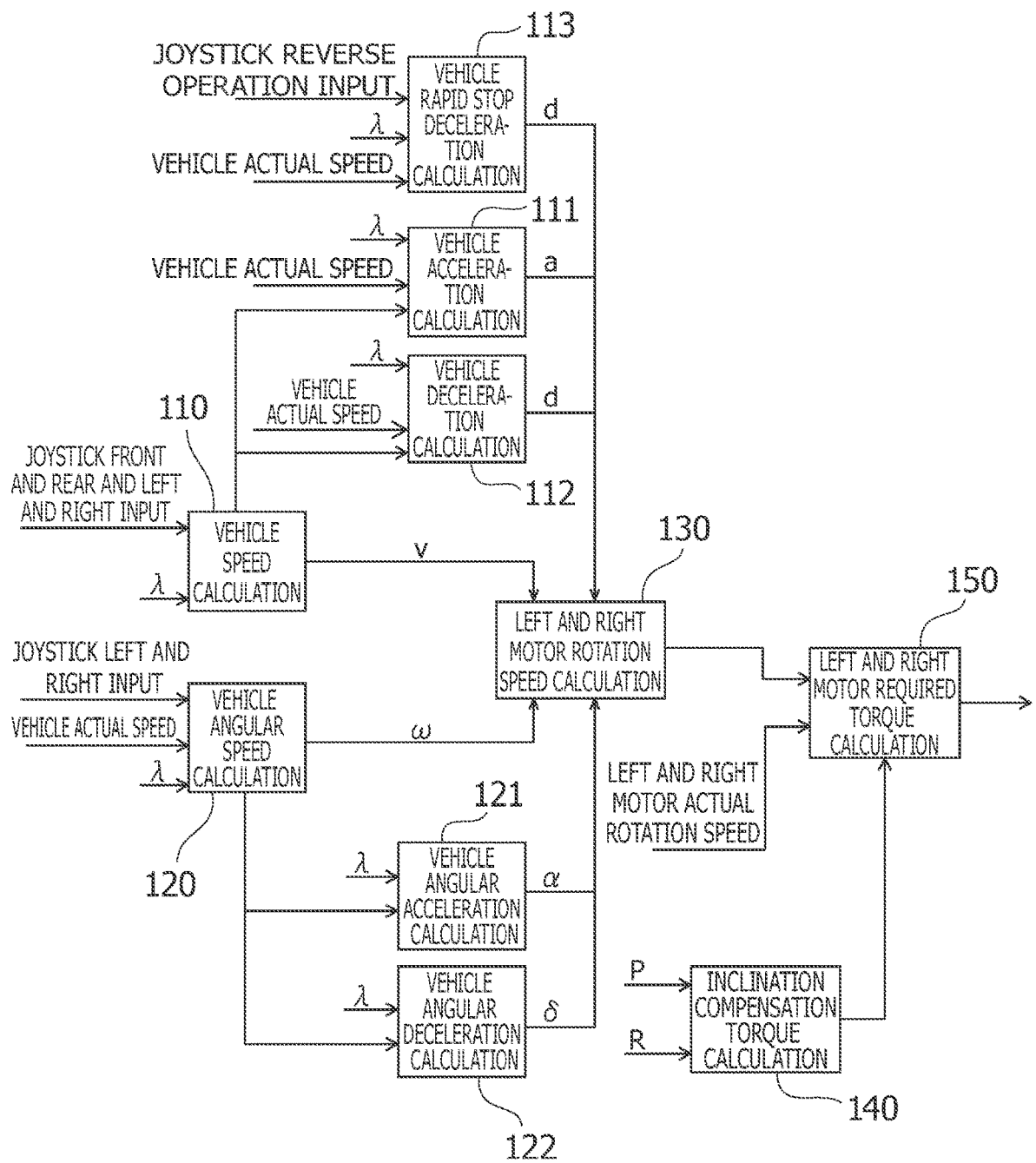
FIG. 5 is a block diagram showing left and right motor control according to a third embodiment.

In FIG. 5, the target vehicle speed v calculated by the target vehicle speed calculation block 110 depending on the inclination angle λ, the vehicle actual speed, and inclination angle λ are input into both the target vehicle acceleration calculation block 111 and the target vehicle deceleration calculation block 112. Here, when the deviation between the vehicle actual speed and the target vehicle speed v is positive, the target vehicle acceleration calculation block 111 calculates the target vehicle acceleration a depending on the inclination angle λ. When the deviation between the vehicle actual speed and the target vehicle speed v is negative, the target vehicle deceleration calculation block 112 calculates the target vehicle deceleration d depending on the inclination angle λ.

In addition, in FIG. 5, the target vehicle angular velocity ω calculated by the target vehicle angular velocity calculation block 120 depending on the inclination angle λ, and the inclination angle λ are input into both the target vehicle angular acceleration calculation block 121 and the target vehicle angular deceleration calculation block 122. Here, when the deviation between the difference between the target rotation speeds of the left and right motors 41 (40L and 40R) corresponding to the target vehicle angular velocity ω, and the difference between the actual rotation speeds of the left and right motors 41 (40L and 40R) detected by the rotation speed sensors 43 is positive, the target vehicle angular acceleration calculation block 121 calculates the target vehicle angular acceleration a depending on the inclination angle λ. When the deviation between the difference between the target rotation speeds of the left and right motors 41 (40L and 40R) corresponding to the target vehicle angular velocity ω, and the difference between the actual rotation speeds of the left and right motors 41 (40L and 40R) detected by the rotation speed sensors 43 is negative, the target vehicle angular deceleration calculation block 122 calculates the target vehicle angular deceleration δ depending on the inclination angle λ.

Consequently, in addition to the target vehicle speed v calculated by the target vehicle speed calculation block 110, and the target vehicle angular velocity ω calculated by the target vehicle angular velocity calculation block 120, the target vehicle acceleration a or the target vehicle deceleration d depending on the inclination angle λ, and the target vehicle angular acceleration a or the target vehicle angular deceleration δ depending on the inclination angle λ are input into the left and right motor target rotation speed calculation block 130. The target rotation speeds of the left and right motors 41 (40L and 40R) are calculated based on the target rotation speeds of the left and right motors 41 (40L and 40R) corresponding to the target vehicle speed v, on the difference between the target rotation speeds of the left and right motors 41 (40L and 40R) corresponding to the target vehicle angular velocity ω, on the target vehicle acceleration a or the target vehicle deceleration d, and on the target vehicle angular acceleration a or the target vehicle angular deceleration δ.

As described above, not only the target vehicle speed v and the target vehicle angular velocity ω depending on the inclination angle λ, but also the target vehicle acceleration a or the target vehicle deceleration d and the target vehicle angular acceleration a or the target vehicle angular deceleration δ set depending on the inclination angle λ are reflected, and the target rotation speeds of the left and right motors 41 (40L and 40R) are calculated. The left and right motor required torque calculation block 150 calculates the left and right motor required torques on the basis of the deviation between the actual rotation speeds of the left and right motors 41 (40L and 40R) and the target rotation speeds, thus executing current control for the left and right motors 41 (40L and 40R).

(Target Vehicle Deceleration Map)

Figure 10:
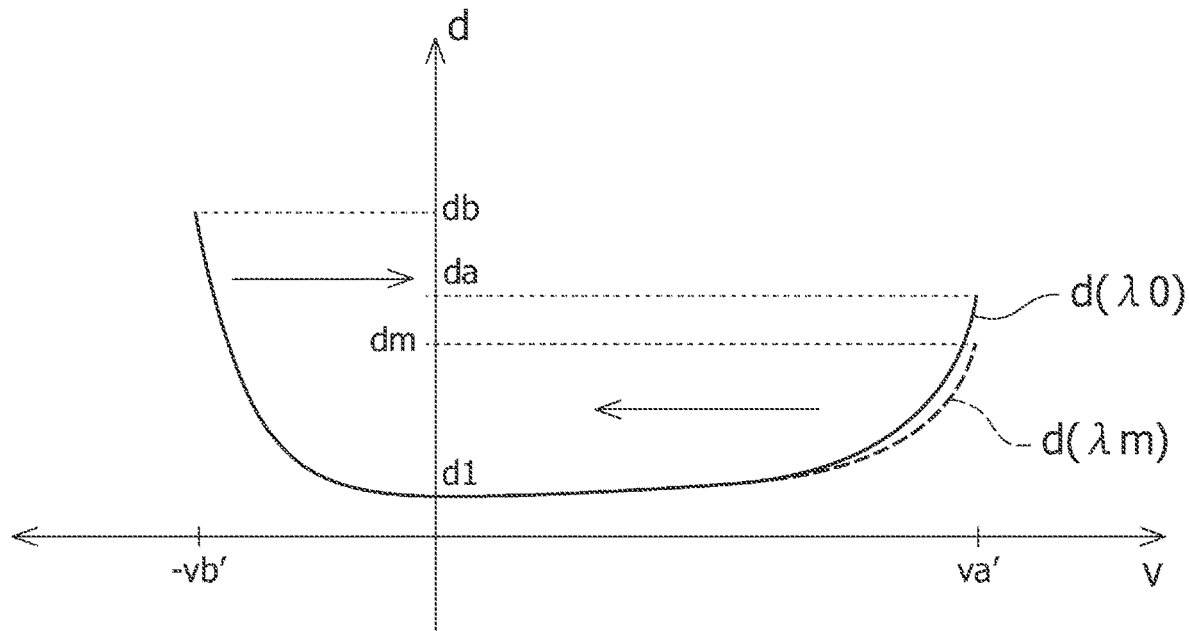
FIG. 10 shows a target vehicle deceleration map depending on the inclination angle ($\lambda$) and actual speed.

FIG. 10 shows a target vehicle deceleration map that defines a relationship between the vehicle actual speed v and the target vehicle deceleration d for target vehicle deceleration calculation (112). Solid lines in the diagram indicate the target vehicle deceleration map in the case with the inclination angle λ=λ0 (zero inclination). Broken lines indicate the target vehicle deceleration map in the case with the inclination angle λ=λm (set maximum inclination angle).

These target vehicle deceleration maps are stored as look-up tables in the ROM area of the control unit 10. When the inclination angle λ is zero degrees or less than a predetermined threshold λ1 (e.g., three degrees) that can be substantially assumed as flat land, the target vehicle deceleration map with the inclination angle λ=λ0 is applied. When the inclination angle λ is equal to or greater than the set maximum inclination angle, the target vehicle deceleration map with the inclination angle λ=λm is applied. When the inclination angle λ is equal to or greater than the predetermined threshold λ1 and is less than the set maximum inclination angle λm, calculation is performed using the expression 2 described above.

According to the target vehicle deceleration map shown in FIG. 10, when the vehicle actual speed v in the forward traveling direction is in the high speed region (e.g., 4 km/h or higher), the maximum target vehicle decelerations da and dm during traveling forward are designated. With respect to the target vehicle deceleration da (e.g., 5 km/h/s=1.39 m/s$^2$) in the case with the inclination angle λ=λ0, the target vehicle deceleration dm (e.g., 4 km/h/s=1.11 m/s$^2$) in the case with the inclination angle λ=λm has a small value. Thus, when the inclination angle λ is large, rapid deceleration is prevented.

On the other hand, when the vehicle actual speed v in the backward traveling direction is in the high speed region (e.g., −1 km/h), the maximum target vehicle deceleration db (e.g., 7 km/h/s=1.94 m/s$^2$) during traveling backward is designated. However, during backward traveling, the target vehicle deceleration d is not changed depending on the inclination angle λ. In the backward traveling direction, the absolute value of the traveling speed is suppressed to that of a low speed. Accordingly, even if the target vehicle deceleration is set similarly to that in the case of a flat road, the deceleration is not rapid, and secure stopping is prioritized.

Note that during traveling forward and during traveling backward, the target vehicle deceleration d decreases with decrease in the vehicle actual speed v. At a speed of zero and in the low speed region, the value becomes a lower limit value d1 (e.g., 1 km/h/s=0.28 m/s$^2$).

(Target Vehicle Angular Deceleration Map)

Figure 11:
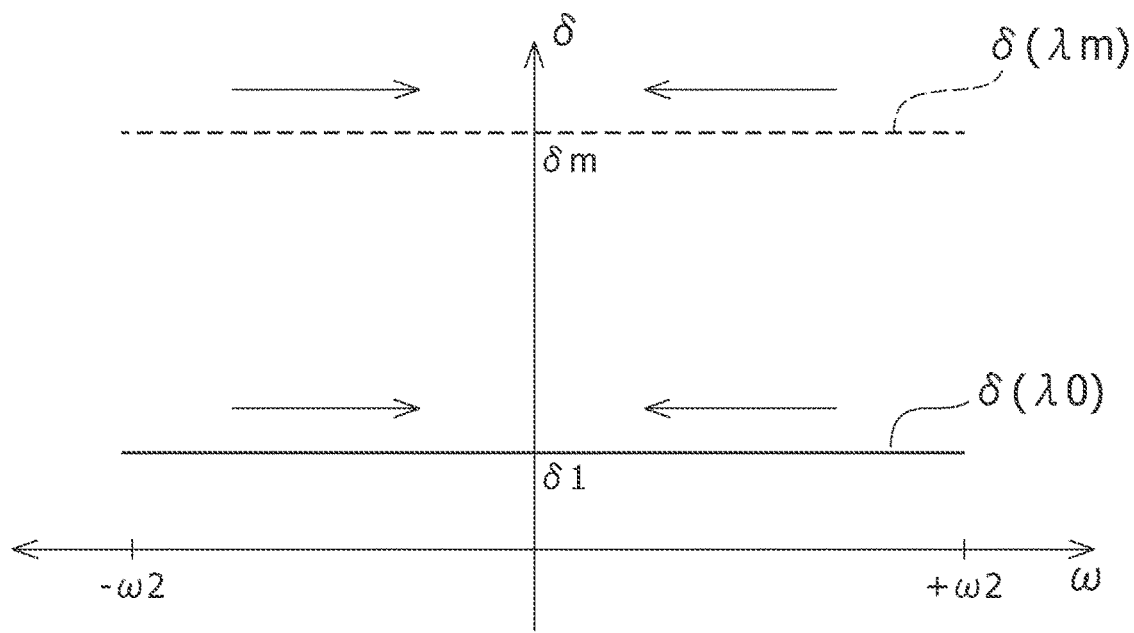
FIG. 11 shows a target vehicle angular deceleration map depending on the inclination angle ($\lambda$) and actual speed.

FIG. 11 shows a target vehicle angular deceleration map that defines a relationship between the angular velocity ω and the target vehicle angular deceleration δ for target vehicle angular deceleration calculation (122). Solid lines in the diagram indicate the target vehicle angular deceleration map in the case with the inclination angle λ=λ0 (zero inclination). Broken lines indicate the target vehicle angular deceleration map in the case with the inclination angle λ=λm (set maximum inclination angle).

According to the target vehicle angular deceleration map shown in FIG. 11, in comparison with the target vehicle angular deceleration δ1 in the case with the inclination angle λ=λ0 (e.g., 480 degrees/s$^2$=8.38 rad/s$^2$), a large target vehicle angular deceleration δm (e.g., 1800 degrees/s$^2$=31.4 rad/s$^2$) is designated in the case with the inclination angle λ=λm. Even when the inclination angle λ is large, the turning can be securely stopped against the moment of inertia.

(Rapid Stop Control in Riding Mode)

In each of the aforementioned embodiments, control during normal operation on the joystick 83 based on the basic target vehicle speed map (FIG. 6) and target vehicle angular velocity map (FIG. 7) has been described. In a state in which the joystick 83 is operated forward, and forward traveling or forward turning traveling is performed at a vehicle speed equal to or higher than a predetermined threshold val (e.g., 0.5 km/h), when the joystick 83 is subjected to a reverse operation backward, rapid stop control is executed irrespective of the left or right direction component.

That is, in the block diagram shown in FIG. 5, joystick inputs into the target vehicle speed calculation block 110 and the target vehicle angular velocity calculation block 120 are ignored. The target vehicle speed v and the target vehicle angular velocity ω are set to zero. Based on the vehicle actual speed and the inclination angle λ input into a vehicle rapid stopping deceleration calculation block 113, the target vehicle rapid deceleration d is calculated.

Figure 12:
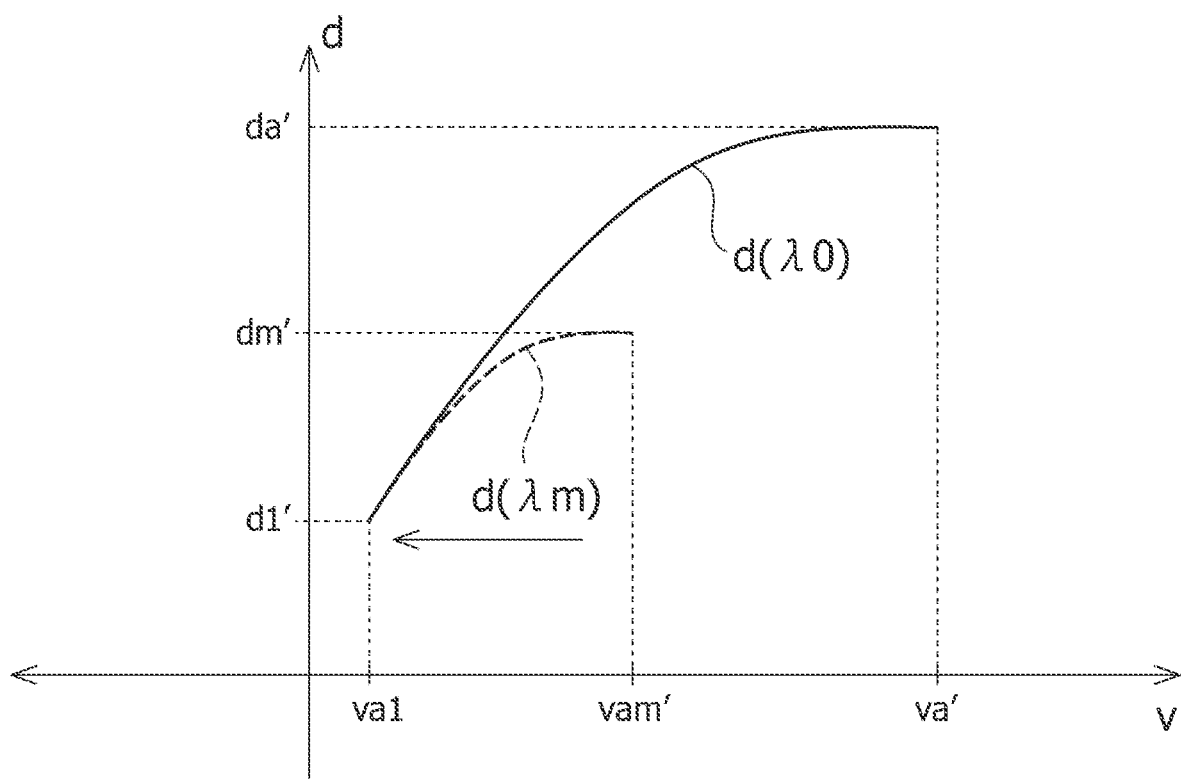
FIG. 12 shows a target vehicle rapid deceleration map depending on the inclination angle ($\lambda$) and actual speed during rapid stop control.

FIG. 12 shows a target vehicle rapid deceleration map that defines a relationship between the vehicle actual speed v and the target vehicle rapid deceleration d for target vehicle rapid deceleration calculation (113). Solid lines in the diagram indicate the target vehicle rapid deceleration map in the case with the inclination angle $\lambda=\lambda 0$ (zero inclination). Broken lines indicate the target vehicle rapid deceleration map in the case with the inclination angle $\lambda=\lambda m$ (set maximum inclination angle).

As shown in FIG. 12, during rapid stop control, depending on the vehicle actual speed v at the start of rapid stop control, the target vehicle rapid deceleration is set from the maximum target vehicle rapid decelerations da' and dm', which are sufficiently greater than those during normal control (FIG. 10), to the target vehicle rapid deceleration d1' at the vehicle speed threshold val in rapid stop control, in order to securely achieve braking and stopping in a short time as much as possible.

Here, with respect to the maximum target vehicle rapid deceleration da' (e.g., 15 km/h/s=4.17 m/s$^2$) in the case with the inclination angle $\lambda=\lambda 0$, the maximum target vehicle rapid deceleration dm' (e.g., 7 km/h/s=1.94 m/s$^2$) in the case with the inclination angle $\lambda=\lambda m$ has a small value.

This is because in addition to the fact that on an inclined surface the vehicle actual speed at the start of rapid stop control subjected to lambda control is suppressed in the low speed region in comparison with that during flat ground travel, the load on the user becomes large on a downhill inclined surface due to rapid braking, and conversely, on a climbing inclined surface, a large braking force is not required in comparison with the case on the flat road. The target vehicle rapid deceleration d1' (e.g., 3 km/h/s=0.83 m/s$^2$) at the minimum vehicle speed val (e.g., 0.5 km/h) at which the rapid stop control is actuated is designated to have the same value.

As described above, according to the target vehicle rapid deceleration map, the rapid stopping deceleration control is executed. Regenerative braking by the left and right motor units 40 is executed. In a state in which the electric vehicle 1 has a predetermined low speed or lower, the left and right motor units 40 are locked by the respective electromagnetic brakes 42, and the electric vehicle 1 is completely stopped.

When the joystick 83 is operated forward, or to the neutral position n during the rapid stop control (or when being returned by itself), or when a predetermined time period (e.g., four seconds) elapses after the vehicle is stopped by the rapid stop control, the rapid stop control is finished, and the control transitions to normal control on the basis of the operation position of the joystick 83 and the inclination angle $\lambda$ at the time.

As described in detail above, the electric vehicle 1 according to the present invention changes the speed control and the acceleration/deceleration characteristics depending on the inclination angle $\lambda$ when the inclination in the forward and backward direction (pitch angle P) and the inclination in the width direction (roll angle R) that affect the travel of the small electric vehicle are integrated, and obtains the acceleration/deceleration characteristics and turning characteristics optimized depending on the road inclination and the travel state only through an intuitive operation on the joystick 83 by control that changes the turning characteristics depending on the inclination angle $\lambda$ and the vehicle actual speed. The characteristics are advantageous in improving simplification of the operation and the usability. Furthermore, the loads on the vehicle body system and motors are reduced, which is advantageous in reducing the weight of vehicle body and the manufacturing cost.

In particular, according to the target vehicle speed control (110) in consideration of the inclination angle $\lambda$, when the inclination angle $\lambda$ is significant with respect to the flat road, reduction in target vehicle speed can reduce the load on the user due to the road inclination and the travel of the vehicle, and the load on the motors.

Likewise, according to the target vehicle angular velocity control (120) in consideration of the inclination angle $\lambda$, when the inclination angle $\lambda$ is significant with respect to the flat road, reduction in target vehicle angular velocity can reduce the load on the user due to the road inclination and the turning behavior of the vehicle, and the load on the motors.

In addition, according to the target vehicle acceleration control (111) in consideration of the inclination angle $\lambda$, when the inclination angle $\lambda$ is significant with respect to a flat road, increase in target vehicle acceleration mainly in the low speed region compensates for the delay of rising of the acceleration/deceleration control due to reduction in target vehicle speed, and operability similar to that on a flat road is achieved.

Likewise, according to the target vehicle angular acceleration control (121) in consideration of the inclination angle $\lambda$, when the inclination angle $\lambda$ is significant with respect to a flat road, increase in target vehicle angular acceleration compensates for the delay of rising of the turning control due to reduction in target vehicle angular velocity, and turning operability similar to that on a flat road is achieved.

Furthermore, according to the target vehicle deceleration control (112) in consideration of the inclination angle $\lambda$, when the inclination angle $\lambda$ is significant with respect to a flat road, reduction in target vehicle deceleration can reduce the load on the user due to the road inclination and the deceleration behavior of the vehicle.

According to the target vehicle angular deceleration control (122) in consideration of the inclination angle $\lambda$, when the inclination angle $\lambda$ is significant with respect to the flat road, increase in target vehicle angular deceleration can securely and rapidly stop turning against the moment of inertia even on an inclined surface, and obtain operability similar to that on a flat road.

The embodiments of the present invention have been described above. However, the present invention is not limited to the embodiments. Based on the technical concept of the present invention, various modifications and changes can further be made.

For example, in the embodiments described above, the case in which the electric vehicle 1 has the rollator mode has been described. However, the present invention can be implemented as a small electric vehicle or an electric wheelchair that has no rollator mode.

In the embodiments described above, the case of including the omni wheels as driven wheels 5 has been described. Alternatively, caster type free wheels may be included.

The invention claimed is:

1. A small electric vehicle comprising:
   a vehicle body that has a forward and backward direction, and a width direction;
   left and right driving wheels provided apart in the width direction of the vehicle body;
   free wheels provided apart from the left and right driving wheels in the forward and backward direction of the vehicle body;

left and right motors connected so as to respectively transmit power to the left and right driving wheels;

left and right rotation speed sensors detecting rotation speeds of the left and right motors;

an inclination sensor detecting an inclination of the vehicle body as a pitch angle corresponding to a component in the forward and backward direction, and a roll angle corresponding to a component in the width direction;

an operation unit that comprising a joystick-type operation element; and a control unit that controls the left and right motors according to an amount of operation on the operation element, wherein an angular velocity related to turning of the vehicle is provided in accordance with the rotational speed difference between the left and right drive wheels, and wherein the control unit is configured to calculate target rotation speeds of the left and right motors, based on a target vehicle speed provided by an inclination angle, wherein said inclination angle is a single parameter in consideration of the pitch angle and the roll angle detected through the inclination sensor and by an operation position of the operation element, and on a target vehicle angular velocity provided by the inclination angle, by a left and right direction component of the operation position and by the actual speed of the vehicle, and control the left and right motors such that actual rotation speeds of the left and right motors follow the respective target rotation speeds.

2. The small electric vehicle according to claim 1, wherein the control unit comprises: a target speed map that defines a relationship between the operation position of the operation element and the target vehicle speed according to the inclination angle; and a target angular velocity map that defines a relationship between the operation position of the operation element and the target vehicle angular velocity according to the inclination angle and the actual speed, the target speed map is configured such that when the inclination angle is equal to or greater than a predetermined threshold, a maximum target speed decreases according to the inclination angle, the target angular velocity map is configured such that when the inclination angle is equal to or greater than a predetermined threshold, a maximum target angular velocity decreases according to the inclination angle, and the control unit is configured to calculate the target rotation speeds of the left and right driving wheels, based on the target speed map according to the inclination angle, and the target angular velocity map according to the inclination angle and the actual speed.

3. The small electric vehicle according to claim 2, wherein the control unit further comprises a target acceleration map that defines a relationship between the actual speed and a target acceleration according to the inclination angle, and the target acceleration map is configured such that when the inclination angle is equal to or greater than a predetermined threshold, a maximum target acceleration increases according to the inclination angle.

4. The small electric vehicle according to claim 2, wherein the control unit further comprises a target acceleration map that defines a relationship between the actual speed and a target acceleration according to the inclination angle, and a target deceleration map that defines a relationship between the actual speed and a target deceleration according to the inclination angle, and the target acceleration map is configured such that when the inclination angle is equal to or greater than a predetermined threshold, a maximum target acceleration increases according to the inclination angle, and the target deceleration map is configured such that when the inclination angle is equal to or greater than a predetermined threshold, a maximum target deceleration during forward travel decreases according to the inclination angle, and the control unit is configured so as to apply the target acceleration map when the target vehicle speed provided by the target speed map increases, and apply the target deceleration map when the target speed decreases.

5. The small electric vehicle according to claim 2, wherein the control unit further comprises a target angular acceleration map that defines a relationship between the actual speed and a target angular acceleration according to the inclination angle, and the target angular acceleration map is configured such that when the inclination angle is equal to or greater than a predetermined threshold, a maximum target angular acceleration increases according to the inclination angle.

6. The small electric vehicle according to claim 2, wherein the control unit further comprises a target angular acceleration map that defines a relationship between the actual speed and a target angular acceleration according to the inclination angle, and a target angular deceleration map that defines a relationship between the actual speed and a target angular deceleration according to the inclination angle, and the target angular acceleration map is configured such that when the inclination angle is equal to or greater than a predetermined threshold, a maximum target angular acceleration increases according to the inclination angle, and the target angular deceleration map is configured such that when the inclination angle is equal to or greater than a predetermined threshold, a maximum target angular deceleration increases according to the inclination angle, and the control unit is configured so as to apply the target angular acceleration map when the target angular velocity provided by the target angular velocity map increases, and apply the target angular deceleration map when the target angular velocity decreases.

7. The small electric vehicle according to claim 2, wherein the target speed map comprises: a forward region that comprises a front end in an operation range of the operation element; a backward region that comprises a rear end; a left and right side regions that respectively include left and right ends; and a center region that includes a center, the forward region provides an indication on a first target forward speed, the backward region provides an indication on a target backward speed, the left and right side regions provide an indication on a second target forward speed, and the center region provides an indication on stopping, and the first target forward speed is higher than the second target forward speed, and the second target forward speed has an absolute value greater than or equal to an absolute value of the target backward speed, and when the inclination angle is equal to or greater than a predetermined threshold, the first target forward speed and the second target forward speed decrease according to the inclination angle.

8. The small electric vehicle according to claim 2,
wherein the target angular velocity map comprises: a target angular velocity map for high speed that defines a target vehicle angular velocity when the actual speed is at a maximum speed or in a predetermined high speed region in a setting speed region for the vehicle; and a target angular velocity map for low speed that defines a target vehicle angular velocity when the actual speed is in a low speed region or a speed of zero,
the target angular velocity map for high speed and the target angular velocity map for low speed each include left and right side regions including left and right ends, and a center region including a center, in an operation range of the operation element, and are configured such that the left and right side regions provide an indication on a maximum target angular velocity, the center region provides an indication on a target angular velocity of zero, and a maximum target angular velocity of the target angular velocity map for high speed is higher than a maximum target angular velocity of the target angular velocity map for low speed,
when the inclination angle is equal to or greater than a predetermined threshold, the maximum target angular velocity decreases according to the inclination angle, and
the control unit is configured so as to selectively apply the target angular velocity map for high speed or the target angular velocity map for low speed, according to the actual speed of the vehicle.

9. The small electric vehicle according to claim 1,
wherein provided with the pitch angle (P) and the roll angle (R), the inclination angle ($\lambda$) is given as follows $$\lambda = |P| + |R|.$$

* * * * *